United States Patent
Pasquetto

(10) Patent No.: US 6,886,225 B2
(45) Date of Patent: May 3, 2005

(54) WORKTABLE FOR NUMERICAL CONTROL MACHINE TOOLS

(75) Inventor: Franco Pasquetto, Cadoneghe (IT)

(73) Assignee: O.M.V. Officine Meccaniche Venete S.r.l., S. Maria Di Sala (IT)

( * ) Notice: Subject to any disclaimer, the term of this patent is extended or adjusted under 35 U.S.C. 154(b) by 0 days.

(21) Appl. No.: 10/670,123

(22) Filed: Sep. 23, 2003

(65) Prior Publication Data

US 2004/0115018 A1 Jun. 17, 2004

(30) Foreign Application Priority Data

Sep. 24, 2002 (IT) ..................................... TO2002A0835

(51) Int. Cl.⁷ ............................ B23P 23/02; B23C 1/14
(52) U.S. Cl. ....................... 29/27 C; 310/114; 310/112; 409/165; 409/168; 409/221; 409/224; 82/122
(58) Field of Search ............................ 29/27 C, 27 R; 310/114, 112, 118–121; 409/165–168, 198, 221, 224; 82/122; 74/813 R; 108/20–21, 139; 269/57, 63, 71; 408/70–71

(56) References Cited

U.S. PATENT DOCUMENTS

| | | | | |
|---|---|---|---|---|
| 3,460,435 A | * | 8/1969 | Dahl et al. ................... | 409/183 |
| 3,587,390 A | * | 6/1971 | Lohneis et al. .............. | 409/221 |
| 4,197,629 A | * | 4/1980 | Reese et al. ................... | 82/122 |
| 4,286,479 A | * | 9/1981 | Baumann et al. .............. | 74/724 |
| 4,749,898 A | | 6/1988 | Suzuki et al. | |
| 4,951,376 A | * | 8/1990 | Grund ........................ | 29/27 C |
| 5,020,201 A | * | 6/1991 | Kitamura ..................... | 29/27 C |
| 5,172,798 A | | 12/1992 | Mabee | |
| 5,234,081 A | | 8/1993 | Watanabe | |
| 5,525,851 A | * | 6/1996 | Kumamoto et al. ......... | 310/114 |
| 5,717,264 A | * | 2/1998 | Hadano ....................... | 310/112 |
| 5,720,590 A | * | 2/1998 | Hofmeister .............. | 414/744.2 |
| 6,352,496 B1 | * | 3/2002 | Oldani ....................... | 409/168 |
| 6,355,999 B1 | | 3/2002 | Kichiji et al. | |
| 2002/0077233 A1 | * | 6/2002 | Oldani ......................... | 483/55 |

FOREIGN PATENT DOCUMENTS

GB            2278242 A    *   11/1994
WO       WO-96/09913 A1   *   4/1996

* cited by examiner

Primary Examiner—Erica Cadugan
(74) Attorney, Agent, or Firm—Sheridan Ross PC

(57) ABSTRACT

A worktable for numerical control machines, having a supporting structure hinged to the frame of the machine tool, and a faceplate fitted for rotation to the supporting structure to rotate, on command, about a first reference axis; the worktable having a first drive unit specially designed, on command, to rotate, and maintain rotation of, the faceplate at high speed about the first axis, and a second drive unit specially designed to vary, as required, the angular position of the faceplate about the first axis and with respect to a predetermined angular reference.

23 Claims, 2 Drawing Sheets

WORKTABLE FOR NUMERICAL CONTROL MACHINE TOOLS

The present invention relates to a worktable for numerical control machine tools.

More specifically, the present invention relates to a worktable for five-axis numerical control milling machines for producing mechanical parts with complex three-dimensional structures, to which the following description refers purely by way of example.

BACKGROUND OF THE INVENTION

As is known, most known five-axis numerical control milling machines are equipped with a rocking worktable, which substantially comprises a cradle-like supporting structure hinged at both ends to the machine frame to rotate, on command, about a first horizontal reference axis; and a circular faceplate fitted for rotation to the central body of the supporting structure to rotate, on command, about a second reference axis perpendicular to the first reference axis. The faceplate is obviously coaxial with the second reference axis, and is normally positioned on the supporting structure so that its top face is coplanar with the first reference axis.

Known worktables are also equipped with two drive devices: a first for rotating the worktable supporting structure, on command, about the first reference axis to vary the tilt of the supporting structure, and therefore of the faceplate, as required with respect to the floor; and a second for rotating the faceplate, on command, about the second reference axis to vary the orientation of the work on the supporting structure as required.

In the best worktables currently used, the faceplate has a central cylindrical guide pin extending inwards of the supporting structure, coaxially with the second reference axis; and the second drive device is defined by an electric so-called torque motor housed inside the central body of the supporting structure so as to be connected directly to the cylindrical pin of the faceplate, and by a hydraulic brake device for selectively preventing any rotation of the cylindrical pin about the second reference axis. More specifically, the rotor of the electric torque motor is fitted directly to the cylindrical pin of the faceplate, and the stator of the electric motor is housed inside the central body of the supporting structure so as to be fitted to the rotor.

Though unequalled in the performance of conventional machining operations requiring accurate position control of the work, worktables of the above type have serious limitations when the milling machine is called upon to perform machining operations typical of a lathe. In which case, contrary to standard practice, the milling machine may be called upon to rotate the work about the second reference axis at angular speeds well above 1000 rpm, while the tool removes material from the work while remaining stationary in space and resting on the surface of the work.

As such, the electric torque motor controlling the position of the faceplate is obviously called upon to operate well outside normal operating conditions, with all the drawbacks this entails.

In the case in question, being specifically designed for low-speed rotation and highly accurate positioning of the work, the electric torque motor controlling the position of the faceplate is unable to reach rotation speeds of over a few hundred rpm without generating severe mechanical vibration, which may even impair operation of the machine and cause irreparable damage to the motor.

SUMMARY OF THE INVENTION

It is an object of the present invention to provide a worktable for numerical control machines, which is more versatile than known types.

According to the present invention, there is provided a worktable for numerical control machines, comprising a supporting structure fixed to the frame of said machine tool, and a faceplate fitted for rotation to said supporting structure to rotate, on command, about a first reference axis; said worktable being characterized by comprising a first drive unit specially designed to rotate, and maintain rotation of, the faceplate at high speed about said first axis; and a second drive unit specially designed to vary, as required, the angular position of said faceplate about said first axis and with respect to a predetermined angular reference.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
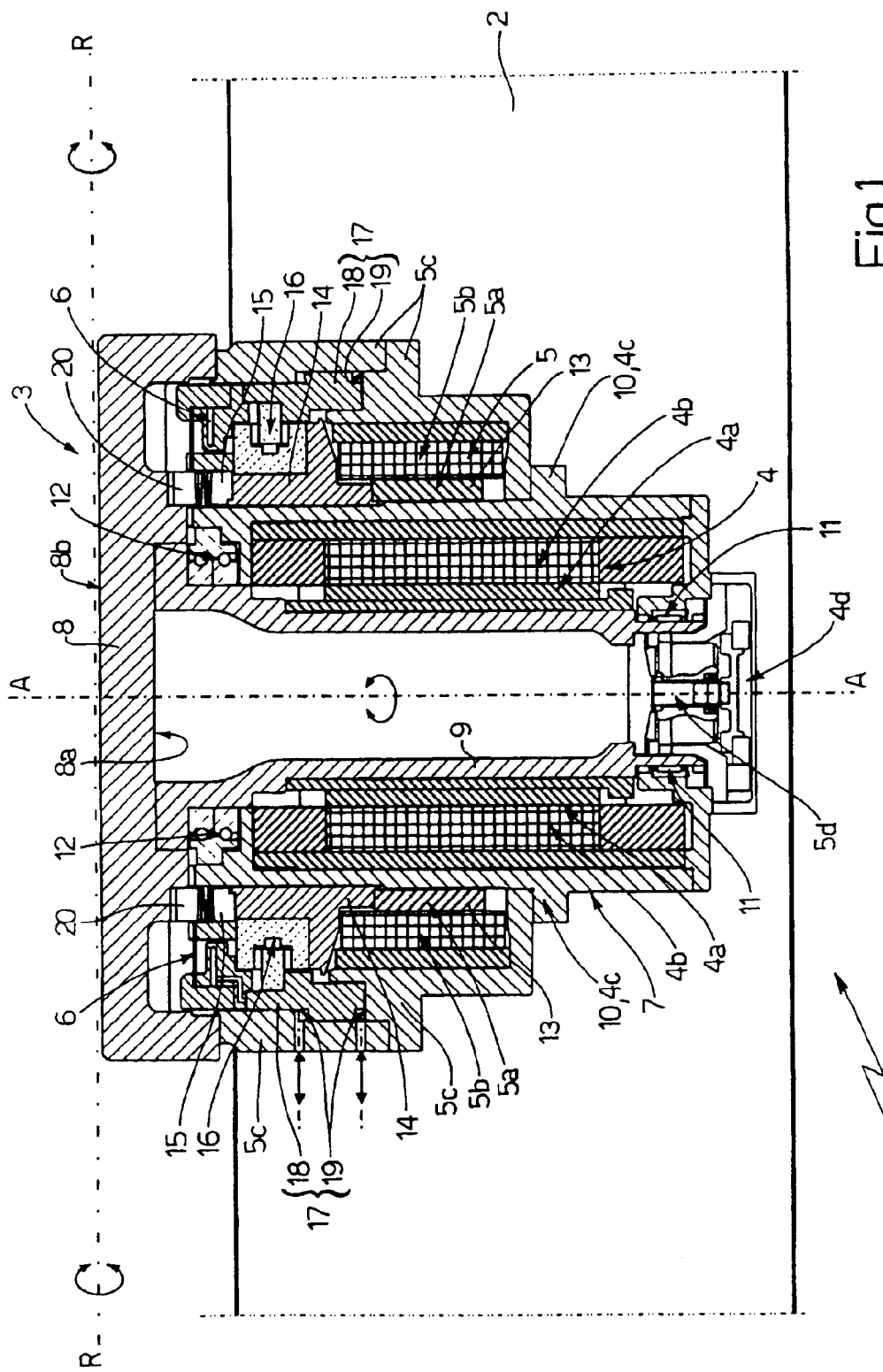
FIG. 1 shows a section, in a first operating configuration, of a worktable for numerical control machine tools, in accordance with the teachings of the present invention.
Figure 2:
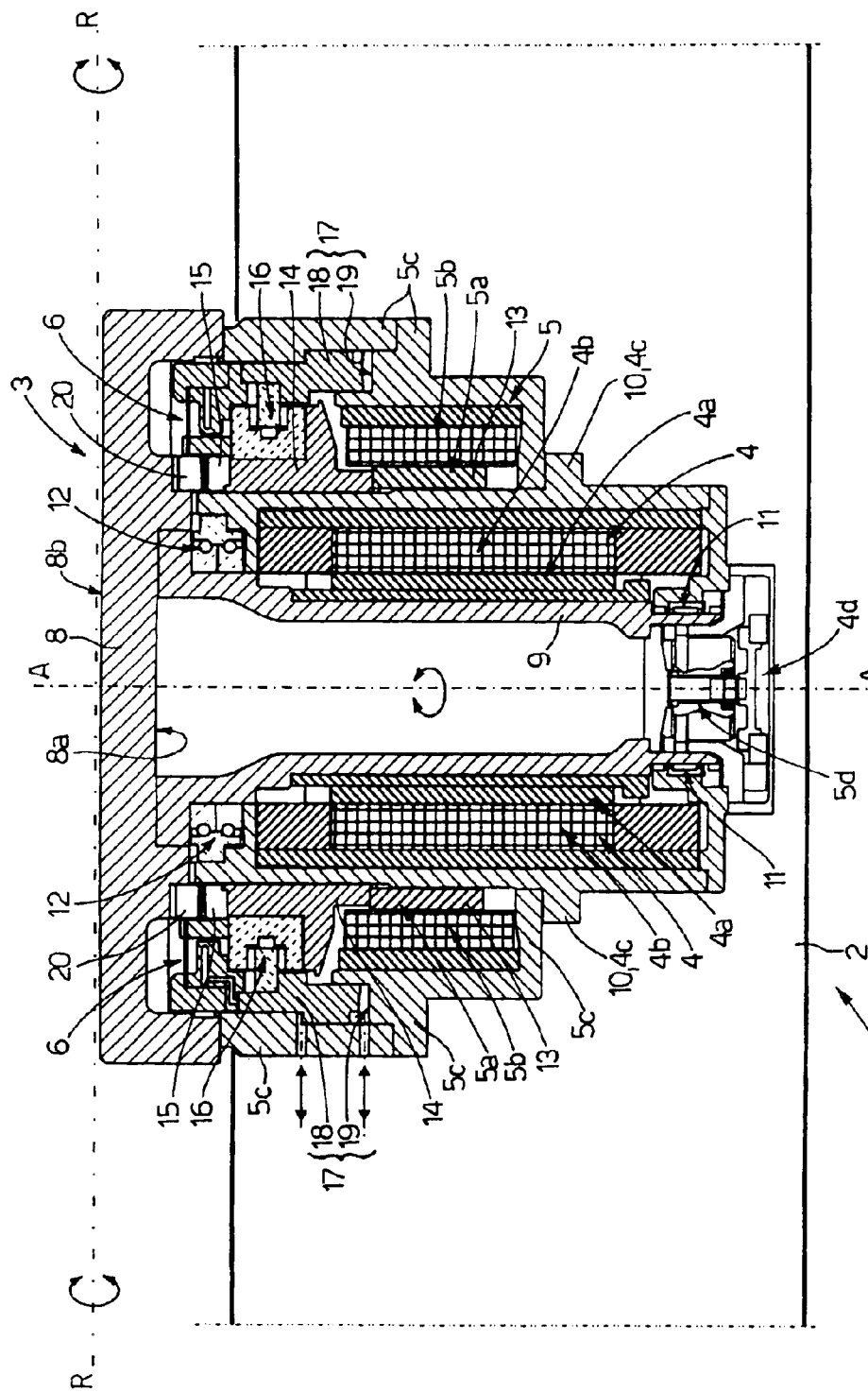
FIG. 2 shows a section of the FIG. 1 worktable in a second operating configuration.

Number 1 in FIGS. 1 and 2 indicates as a whole a worktable for numerical control machine tools, which is particularly advantageous for use on five-axis numerical control milling machines for producing mechanical parts with complex three-dimensional structures.

Worktable 1 substantially comprises a supporting structure 2 hinged to the frame (not shown) of the machine tool so as to rotate, on command, about a first preferably, though not necessarily, horizontal reference axis R; a faceplate 3 fitted for rotation to the central body of supporting structure 2 so as to rotate, on command, about a second reference axis A perpendicular to axis R; and a first drive unit 4 specially designed to rotate, on command, and to maintain rotation of, faceplate 3 at high speed about axis A.

Worktable 1 also comprises a second drive unit 5 connectable, on command, to faceplate 3, and specially designed to vary, as required, the angular position of faceplate 3 with respect to a predetermined angular reference; and a lock device 6 for preventing, on command, any rotation of faceplate 3 about axis A.

With reference to FIGS. 1 and 2, in the example shown, supporting structure 2 (only shown partly in the accompanying drawings) of worktable 1 is in the form of a cradle, and is hinged to the machine frame (not shown) at both axial ends (not shown) to rotate, or rather oscillate, freely about axis R.

Faceplate 3 is housed at least partly inside a seat 7 formed on the central body of supporting structure 2, and substantially comprises a disk-shaped supporting plate 8 coaxial with axis A and just outside supporting structure 2 to close the mouth of seat 7; a substantially cylindrical central pin 9 projecting, coaxially with axis A, inwards of seat 7 from the centre of supporting plate 8; and a pin-guide bell 10 fixed rigidly to supporting structure 2, inside seat 7, to support central pin 9 in rotary manner.

In the example shown, pin-guide bell 10 extends, coaxially with axis A, inside seat 7 to house substantially the whole length of central pin 9, and has a central through hole at the bottom engaged by the distal end of central pin 9.

In the example shown, central pin 9 is fitted to rotate freely inside pin-guide bell 10 via the interposition of two known rolling bearings, a first of which, indicated 11, is located at the distal end of central pin 9, and a second of which, indicated 12, is located on the body of central pin 9, just below the bottom face 8a of supporting plate 8, i.e. the major lateral surface directly facing central pin 9.

In addition, in the example shown, supporting plate 8 is fitted for rotation to supporting structure 2 so that its top face 8b, i.e. the major lateral surface not directly facing central pin 9, is substantially coplanar with axis R; and, in the example shown, top face 8b of supporting plate 8 has a number of longitudinal grooves and/or other locking systems for easy attachment of the work.

With reference to FIGS. 1 and 2, drive unit 4 is specially designed to rotate, and to maintain rotation of, faceplate 3 about axis A at an angular speed preferably, though not necessary, of over 500 rpm, and is defined by a polyphase electric motor 4—synchronous, asynchronous or similar—housed inside pin-guide bell 10 so as to be connected directly to central pin 9 of faceplate 3.

In the example shown, the rotor 4a of polyphase electric motor 4 is of cylindrical tubular shape and fitted directly to central pin 9 so as to be perfectly coaxial with axis A, while the conventional (i.e. tubular) stator 4b of polyphase electric motor 4 is fitted directly to rotor 4a, inside the gap between rotor 4a and the lateral wall of pin-guide bell 10, with the body of stator 4b and its windings fixed directly to pin-guide bell 10. In which case, pin-guide bell 10 therefore performs the dual function of supporting central pin 9 and enclosing all the component elements of polyphase electric motor 4, thus defining the outer casing 4c of the electric motor.

Preferably, though not necessarily, polyphase electric motor 4 has a speed sensor 4d for determining instant by instant the angular speed of rotor 4a about axis A.

More specifically, in the example shown, polyphase electric motor 4 has a position and speed sensor (so-called "encoder") 4d for determining instant by instant both the angular position and angular speed of rotor 4a about axis A. In the example shown, position and speed sensor 4d is defined by a known optical transducer fitted to the distal end of central pin 9, just outside pin-guide bell 10.

With reference to FIGS. 1 and 2, drive unit 5 is specially designed to vary, as required, the angular position of faceplate 3 with respect to a predetermined angular reference, by imparting angular movements of given, freely adjustable size to faceplate 3 with a maximum rotation speed of preferably, though not necessarily, less than 200 rpm, and is defined by an brushless or similar electric motor with torque and speed control (so-called "torque" motor) housed inside seat 7 and connectable, on command, to supporting plate 8 of faceplate 3 to rotate supporting plate 8, on command, about axis A.

In the example shown, electric torque motor 5 is housed inside seat 7 so as to be fitted to pin-guide bell 10 and connectable, on command, to the bottom face 8a of supporting plate 8.

More specifically, the rotor 5a of electric torque motor 5 is cylindrical tubular in shape, and is fitted to the outer lateral surface of pin-guide bell 10 so as to rotate freely about axis A and slide axially along the outer lateral surface of pin-guide bell 10 into a first operating position (FIG. 2), in which one of the two axial ends of rotor 5a is connected mechanically to supporting plate 8 of faceplate 3, or into a second operating position (FIG. 1), in which rotor 5a is located a maximum distance from supporting plate 8 and disconnected mechanically from supporting plate 8 of faceplate 3.

The stator 5b of electric torque motor 5, on the other hand, is a conventional, i.e. tubular, type, is fitted to the outer lateral surface of pin-guide bell 10 to face rotor 5a, but, unlike rotor 5a, is fixed rigidly to pin-guide bell 10 by the outer casing 5c of the motor, which in the example shown, is substantially bell-shaped, extends coaxially with axis A, and has a central through hole at the bottom through which the whole of pin-guide bell 10 is fitted.

With reference to FIGS. 1 and 2, in the example shown, rotor 5a of electric torque motor 5 is defined by three cylindrical tubular members 13, 14, 15, which are fitted to the outer lateral surface of pin-guide bell 10 to rotate freely about axis A and slide axially along the outer lateral surface of pin-guide bell 10 in a direction parallel to axis A. The three cylindrical tubular members 13, 14, 15 are obviously aligned successively along pin-guide bell 10, and are fixed rigidly to one another to form one body.

Cylindrical tubular member 14 connects tubular members 13 and 15 rigidly to each other, and is defined by a cylindrical sleeve 14 fitted for rotation to the outer lateral surface of pin-guide bell 10 and maintained coaxial with axis A by a roller bearing 16 fixed to an actuating member 17 for moving the whole of rotor 5a of electric torque motor 5 axially between the first and second operating position.

In the example shown, actuating member 17 of electric torque motor 5 is defined by a cylindrical tubular sleeve 18 mounted to slide axially inside outer casing 5c, and by a double-acting linear hydraulic actuator 19 for moving cylindrical tubular sleeve 18, on command, parallel to axis A, so as to move the whole of rotor 5a of electric torque motor 5 axially between the first and second operating position. The roller bearing 16 is fixed to the inner surface of cylindrical tubular sleeve 18.

Cylindrical tubular member 13, on the other hand, is located inside stator 5a of electric torque motor 5, and is defined by a cylindrical sleeve 13 having a number of permanent magnets (not shown) forming part of the magnetic circuit of the motor; and cylindrical tubular member 15 is located directly facing the bottom face 8a of supporting plate 8, and is defined by a "HIRTH" type ring gear 15 with face teeth facing the bottom face 8a of supporting plate 8 to mesh with supporting plate 8.

More specifically, ring gear 15 meshes selectively with a corresponding "HIRTH" type ring gear 20 with face teeth, which is fixed to the bottom face 8a of supporting plate 8 and coaxial with central pin 9.

Preferably, though not necessarily, electric torque motor 5 has a position and speed sensor (so-called "encoder") 5d for determining instant by instant the angular position and angular speed of rotor 5a with respect to a given angular reference. In the example shown, position and speed sensor 5d is defined by a known optical transducer fitted to the distal end of central pin 9, just above speed sensor 4d.

It should be pointed out that, in addition to the usual function to ensure optimum operation of electric torque motor 5, position sensor 5d may also be used to determine the angular position of supporting plate 8 on supporting structure 2. Fitting position sensor 5d directly to central pin 9, with no gears in-between, in fact, rules out any possibility of measuring error.

Finally, lock device 6 is a commonly used type, and substantially comprises an annular hydraulic jaw fitted to pin-guide bell 10 just below supporting plate 8 to grip, on command, the peripheral edge of supporting plate 8 and so prevent rotation of supporting plate 8 about axis A. More specifically, annular hydraulic jaw 6 is fixed to cylindrical tubular sleeve 18 of actuating member 17 of electric torque motor 5, so as to be fitted to pin-guide bell 10, just below supporting plate 8.

Operation of worktable 1 is easily deducible from the above description with no further explanation required.

It should be pointed out, however, that polyphase electric motor 4 is connected permanently to central pin 9 of faceplate 3, so that rotor 4a of polyphase electric motor 4 is rotated about axis A when electric torque motor 5 is connected mechanically to faceplate 3 to vary the angular position of supporting plate 8. In which case, polyphase electric motor 4 operates as an electric generator. The difference in electric potential, however, generated at the terminals of the electric windings of stator 4b is of negligible value, on account of the maximum rotation speed of central pin 9 produced by electric torque motor 5 being much lower than the minimum producible by polyphase electric motor 4.

The advantages of worktable 1 as described and illustrated herein are obvious: a numerical control milling machine equipped with worktable 1 is capable of safely performing machining operations typical of a lathe with no risk of malfunctioning, and above all with the same degree of efficiency and quality standard as a lathe.

Using two independent drive units—one specially designed to control the angular position of faceplate 3, and the other specially designed for high-speed rotation of faceplate 3 about axis A—worktable 1 is capable of rotating the work at angular speeds comparable to those of a conventional lathe, thus enabling machining operations of equal quality.

Clearly, changes may be made to worktable 1 as described and illustrated herein without, however, departing from the scope of the present invention.

In particular, in a first variation not shown, supporting structure 2 of worktable 1 is fixed rigidly to the machine frame, as opposed to being hinged to the frame to rotate, on command, about axis R. More specifically, in this variation, supporting structure 2 of worktable 1 is fixed rigidly to the machine frame so that axis A is preferably, though not necessarily, vertical.

In a further variation not shown, as opposed to being hinged to the machine frame to rotate, on command, about axis R, supporting structure 2 of worktable 1 is fitted movably to the machine frame so as to translate, on command, in a direction parallel to a third preferably, though not necessarily, vertical reference axis. Being movable up or down, supporting structure 2 is thus able to adjust the height of supporting plate 8 with respect to the floor.

In this variation, supporting structure 2 of worktable 1 may obviously be fitted movably to the machine frame so that axis A is parallel to said third reference axis.

What is claimed is:

1. A worktable for a numerical control machine tool, comprising a supporting structure fixed to a frame of said machine tool, and a faceplate fitted for rotation to said supporting structure to rotate, on command, about a first reference axis; said worktable comprising a first drive motor specially designed to rotate, and maintain rotation of, the faceplate at high speed about said first reference axis and located concentrically within a second drive motor specially designed to vary, as required, the angular position of said faceplate about said first reference axis and with respect to a predetermined angular reference, and wherein the second drive motor is selectively axially actuatable into and out of driving engagement with the faceplate.

2. A worktable as claimed in claim 1, characterized in that said second drive motor is connectable, on command, to said faceplate.

3. A worktable as claimed in claim 1, characterized in that said faceplate is housed inside a seat formed in said supporting structure, and comprises a supporting plate coaxial with said first reference axis; a central pin projecting, coaxially with said first reference axis, inwards of the seat from said supporting plate; and a pin-guide bell fixed rigidly to said supporting structure, inside said seat, so as to support said central pin in rotary manner.

4. A worktable as claimed in claim 3, characterized in that said first drive motor comprises a first electric motor housed inside said pin-guide bell so as to be connected directly to the central pin of said faceplate.

5. A worktable as claimed in claim 4, characterized in that the first electric motor comprises a substantially tubular rotor fitted directly to said central pin; and a stator fitted directly to said rotor and engaging a gap between a lateral wall of said pin-guide bell and said rotor.

6. A worktable as claimed in claim 5, characterized in that said first drive motor comprises speed detecting means for determining the instantaneous angular speed of the rotor of said first electric motor about the first reference axis.

7. A worktable as claimed in claim 3, characterized in that the second drive motor comprises a second electric motor housed inside said seat and connectable, on command, to said supporting plate to rotate the supporting plate, on command, about said first reference axis.

8. A worktable as claimed in claim 7, characterized in that said second electric motor comprises a rotor fitted to the outer lateral surface of said pin-guide bell to rotate freely about said first reference axis.

9. A worktable as claimed in claim 8, characterized in that the rotor of said second electric motor is mounted to slide axially on the outer lateral surface of said pin-guide bell into a first operating position, in which the rotor is connected to said supporting plate, or into a second operating position, in which said rotor is disconnected mechanically from said supporting plate.

10. A worktable as claimed in claim 8, characterized in that said second drive motor comprises angular position detecting means for determining instant by instant the angular position of the rotor of said second electric motor with respect to a given angular reference.

11. A worktable as claimed in claim 7, characterized in that the second electric motor is fitted to said pin-guide bell so as to be connectable, on command, to the bottom face of said supporting plate.

12. A worktable as claimed in claim 7, characterized in that said second electric motor comprises a tubular stator fixed rigidly to said pin-guide bell so as to face a rotor of the second electric motor.

13. A worktable as claimed in claim 9, characterized by comprising an actuating device for moving the rotor of said second electric motor axially between said first and said second operating position.

14. A worktable as claimed in claim 1, characterized by comprising a lock device for selectively preventing any rotation of said faceplate about said first reference axis.

15. A worktable as claimed in claim 1, characterized in that said supporting structure is fixed rigidly to the frame of said machine tool.

16. A worktable as claimed in claim 15, characterized in that said first reference axis is vertical.

17. A worktable as claimed in claim 1, characterized in that said supporting structure is hinged to the frame of said machine tool to rotate, on command, about a second reference axis.

18. A worktable as claimed in claim 17, characterized in that said first reference axis is perpendicular to said second reference axis.

19. A worktable as claimed in claim 18, characterized in that said second reference axis is horizontal.

20. A worktable as claimed in claim 1, characterized in that said supporting structure is fitted movably to the frame of said machine tool to translate, on command, in a direction parallel to a third reference axis.

21. A worktable as claimed in claim 20, characterized in that said third reference axis is vertical.

22. A worktable as claimed in claim 20, characterized in that said first reference axis is parallel to said third reference axis.

23. A numerical control machine tool, characterized by comprising a worktable as claimed in claim 1.

* * * * *